US009546041B2

(12) United States Patent
Sundholm

(10) Patent No.: US 9,546,041 B2
(45) Date of Patent: *Jan. 17, 2017

(54) METHOD AND APPARATUS IN A PNEUMATIC MATERIAL CONVEYING SYSTEM, AND A WASTE CONVEYING SYSTEM

(75) Inventor: Göran Sundholm, Tuusula (FI)

(73) Assignee: MARICAP OY, Vantaa (FI)

(*) Notice: Subject to any disclaimer, the term of this patent is extended or adjusted under 35 U.S.C. 154(b) by 370 days.

This patent is subject to a terminal disclaimer.

(21) Appl. No.: 13/634,193

(22) PCT Filed: Mar. 3, 2011

(86) PCT No.: PCT/FI2011/050182

§ 371 (c)(1),
(2), (4) Date: Sep. 11, 2012

(87) PCT Pub. No.: WO2011/110740

PCT Pub. Date: Sep. 15, 2011

(65) Prior Publication Data

US 2013/0004249 A1 Jan. 3, 2013

(30) Foreign Application Priority Data

Mar. 12, 2010 (FI) ..................................... 20105249

(51) Int. Cl.
*B65G 53/24* (2006.01)
*B65F 5/00* (2006.01)

(52) U.S. Cl.
CPC ..................................... *B65F 5/005* (2013.01)

(58) Field of Classification Search
CPC ................................. B65F 5/005; B65G 53/24
(Continued)

(56) References Cited

U.S. PATENT DOCUMENTS 3,730,884 A * 5/1973 Burns et al. ............ E03F 1/006 137/209
3,819,069 A * 6/1974 Bauman et al. .............. 406/152
(Continued)

FOREIGN PATENT DOCUMENTS

FI 118528 B1 12/2007
FR 2 900 138 A1 10/2007
(Continued)

OTHER PUBLICATIONS

Official Action dated Feb. 27, 2015 issued in corresponding Japanese Application No. 2012-557572 (with English translation).

*Primary Examiner* — Joseph Dillon, Jr.
(74) *Attorney, Agent, or Firm* — Birch, Stewart, Kolasch & Birch, LLP

(57) ABSTRACT

Method in a pneumatic material conveying system, such as in a waste conveying system, which conveying system comprises at least one input point (61) of material, more particularly of waste material, a material conveying pipe (100), which can be connected to an input point (61), and a separating device, in which the material to be conveyed is separated from the conveying air, and also means for achieving a pressure difference in the conveying pipe (100) at least during the conveyance of material. In the method material is conveyed from an input point (61) to an accumulator tank (105) of a subsystem (1), where the material is separated from the conveying air and in a second phase the accumulator tank (105) of the subsystem is emptied.

6 Claims, 8 Drawing Sheets

Waste Station

(58) Field of Classification Search
USPC .......................... 406/197, 117, 120, 151, 168
See application file for complete search history.

(56) References Cited

U.S. PATENT DOCUMENTS

| | | | | |
|---|---|---|---|---|
| 4,171,853 | A * | 10/1979 | Cleaver | F16K 31/48 251/61.5 |
| 4,318,643 | A * | 3/1982 | Larsson et al. | 406/14 |
| 4,695,205 | A * | 9/1987 | Levine | 406/38 |
| 5,100,266 | A * | 3/1992 | Ushitora | E03F 1/006 137/236.1 |
| 5,803,673 | A * | 9/1998 | Reinsch et al. | 406/31 |
| 6,158,926 | A * | 12/2000 | Precetti | B65F 1/127 100/100 |
| 6,322,295 | B1 * | 11/2001 | Gabriele | 406/84 |
| 6,890,129 | B2 * | 5/2005 | Fabbri | 406/106 |
| 8,430,605 | B2 * | 4/2013 | Dietterich | 406/197 |
| 8,529,160 | B2 * | 9/2013 | Ambriz | 406/174 |
| 8,727,671 | B2 * | 5/2014 | Sundholm | E04F 17/10 132/333 |
| 8,992,133 | B2 * | 3/2015 | Sundholm | B65G 53/24 141/7 |
| 9,242,808 | B2 * | 1/2016 | Sundholm | B65F 5/005 |
| 2007/0182031 | A1 | 8/2007 | Sundholm | |
| 2010/0215443 | A1 * | 8/2010 | Sundholm | E04F 17/10 406/51 |
| 2011/0013993 | A1 * | 1/2011 | Sundholm | B65F 5/005 406/151 |
| 2013/0195563 | A1 * | 8/2013 | Sundholm | B65F 5/005 406/153 |

FOREIGN PATENT DOCUMENTS

| | | | |
|---|---|---|---|
| JP | 58-100002 | A | 6/1983 |
| JP | 60-242103 | A | 12/1985 |
| JP | 62-83924 | A | 4/1987 |
| JP | 3-284503 | A | 12/1991 |
| JP | 5-162809 | A | 6/1993 |
| WO | WO 2009/080881 | A1 | 7/2009 |
| WO | WO 2009/080886 | A1 | 7/2009 |
| WO | WO 2009/115640 | A1 | 9/2009 |

* cited by examiner

METHOD AND APPARATUS IN A PNEUMATIC MATERIAL CONVEYING SYSTEM, AND A WASTE CONVEYING SYSTEM

BACKGROUND OF THE INVENTION

An object of an embodiment of the present invention is directed to a method for conveying materials in a pneumatic material conveying system.

An object of an embodiment of the present invention is directed to an apparatus for conveying materials in a pneumatic material conveying system.

An object of an embodiment of the present invention is directed to a waste conveying system that uses an apparatus for conveying materials in a pneumatic material conveying system.

The invention relates generally to pneumatic material conveying systems, such as to partial-vacuum conveying systems, more particularly to the collection and conveying of wastes, such as to the conveying of household wastes.

Systems wherein wastes are conveyed in piping by means of suction are known in the art. In these, wastes are conveyed long distances in the piping by sucking. The apparatuses are used for, among other things, the conveying of wastes in different institutions. It is typical to these systems that a partial-vacuum apparatus is used to achieve a pressure difference, in which apparatus a partial vacuum is achieved in the conveying pipe with partial-vacuum generators, such as with vacuum pumps or with an ejector apparatus. A conveying pipe typically comprises at least one valve means, by opening and closing which the replacement air coming into the conveying pipe is regulated. One of the convenient solutions of new regional building projects is waste management that will operate with a pipe transport system. This means that sorted wastes are sucked along underground pipes to a waste station that is common to the whole region. The system is clean, odorless and noise-free, and is also a more environmentally friendly solution than the conventional waste management and safer from the viewpoint of the adjacent area. In regional building sites in which it has been decided to use a pneumatic pipe transport system in waste transportation, it is typical that it is necessary to build conveying piping to completion and a shared waste station for the region even though the whole construction project would progress slowly and in stages. In this case it is necessary to build the system to completion in respect of the conveying piping and the waste station, although the construction project might last for years or even decades. The capacity of the piping and of the waste station of the system has, however, been made ready taking into account the amount of users to be realized at some time in the future.

The aim of the present invention is to achieve a new type of solution in connection with material conveying systems, by means of which solution the drawbacks of prior art solutions are avoided. Another aim of the invention is to achieve a solution applicable to partial-vacuum conveying systems, by means of which it is possible to modularly increase the size of the system, and in which e.g. the commissioning of equipment that is unnecessary with respect to the capacity requirement, and in a stage that is too early, can be avoided.

BRIEF DESCRIPTION OF THE INVENTION

The method according to the invention is mainly characterized in that in the method in connection with a subsystem its own partial-vacuum generating apparatus is used to achieve the suction effect needed in material conveyance and/or in that in the method the partial-vacuum generating apparatus of a more extensive waste conveying system is used to achieve the suction effect needed in material conveyance, and in that the conveying pipe (10) of a more extensive system is connected into a circuit such that conveying air can be circulated in the conveying pipe (10).

The method according an embodiment of the present invention includes a subsystem with a local partial-vacuum generating apparatus or a portable partial-vacuum generating apparatus that is used to achieve the suction effect. In addition, a more extensive system may be connected into a circuit such that conveying air can be circulated in the conveying pipe. The material may be conveyed from an accumulator tank of a subsystem onwards along a conveying pipe of a more extensive system to the separating device of a waste station, where the material to be conveyed is separated from the conveying air. The partial vacuum is achieved in the circuit with at least one pump device, such as with a partial-vacuum generator and/or a fan. The suction side of the at least one pump device is connected to a separating device. The material is fed into a conveying pipe from the at least one input point of material, which are the input points of waste, such as waste receptacles or refuse chutes. The subsystems are waste conveying systems of a certain area, such as of a city block. Thus, an extensive system, i.e. a total system, is a waste conveying system of a certain area, such as of a city district, which extensive system comprises a number of subsystems.

The apparatus according to the invention is mainly characterized in that the apparatus comprises means for conveying material from an input point (61) to an accumulator tank (105) of a subsystem (1), where the material is separated from the conveying air and which subsystem is fitted to be connected to a local partial-vacuum generating apparatus and to a partial-vacuum generating apparatus of a more extensive waste conveying system, and in that the conveying pipe (10) of a more extensive system is fitted to be connected into a circuit such that conveying air can be circulated in the conveying pipe (10).

The apparatus includes means for conveying material from an accumulator tank of a subsystem onwards along a conveying pipe of a more extensive system to the separating device of a waste station, where the material to be conveyed is separated from the conveying air. The conveying pipe of a more extensive system is fitted to be connected into a circuit such that conveying air can be circulated in the conveying pipe. At least one pump device, such as a partial-vacuum generator and/or a fan, the suction side of which is connected to a separating device, is fitted into the circuit of a more extensive system. The at least one input point of material is the input point of waste, such as waste receptacles or refuse chutes. A subsystem is a waste conveying system of a certain area, such as of a city block. An extensive system, i.e. a total system, is a waste conveying system of a certain area, such as of a city district, which extensive system comprises a number of subsystems.

The solution according to the invention has a number of important advantages. When using a solution according to the invention the costs of the early stage of a waste system in extensive construction projects can be distributed better over a longer time span than before. The system can be expanded modularly by means of subsystems. The solution enables the arranging of a temporary partial-vacuum generator into connection with each subsystem, if so desired, or the system gives the possibility of using just the partial-vacuum generating apparatus of a more extensive system to achieve the suction needed in the use of the system. In this case wastes can be conveyed from the accumulator tank of the waste of subsystems in the desired conveying manner to further treatment. The system according to the invention enables reliable operation and in addition it provides an easy possibility for commissioning a backup system in a malfunction situation of the main system. By using the suction/pressure of the material conveying system, wastes are conveyed e.g. to a tank of a transport means. In this case the transport means can be any transport means whatsoever that comprises a suitable tank, such as a container, or corresponding. By arranging the piping of the system to comprise a circuit where at least a part of the conveying air circulates, the volume of outlet air can be decreased. At the same time the energy consumption of the system decreases. By maintaining a partial vacuum and at the same time maintaining blowing, an effective circulation of conveying air in the circuit and conveying of material in the conveying pipe can be achieved. With the solution according to the invention, it is possible to essentially reduce the volume of outlet air and, at the same time, to reduce possible dust problems and fine particle problems in the outlet pipe. With the solution according to the invention, the noise problem caused by prior art can also be essentially reduced. When the amount of air to be sucked in decreases, the use of energy also decreases. By opening and closing the input points of the system according to the invention, efficient conveying of material into the conveying pipe and conveying in the conveying pipe is achieved, while at the same time it is possible to keep the noise impact caused by the operation of the system small. By arranging the conveying pipe of the material conveying system to be composed of operating areas, i.e. subcircuits, the conveying of material in the conveying piping and the emptying of input points into the conveying pipe can be effectively arranged. By arranging the conveying air circulation in the opposite direction an effective removal of clogging can be achieved. The change of the conveying air circulation into the other direction can be arranged easily in ring piping. The solution according to the invention is suited for use in both conventional conveying systems comprising one or more conveying pipes and conveying systems comprising ring piping.

BRIEF DESCRIPTION OF THE FIGURES

In the following, the invention will be described in more detail by the aid of an example of its embodiment with reference to the attached drawings, wherein.

DETAILED DESCRIPTION OF THE INVENTION

Figure 7:
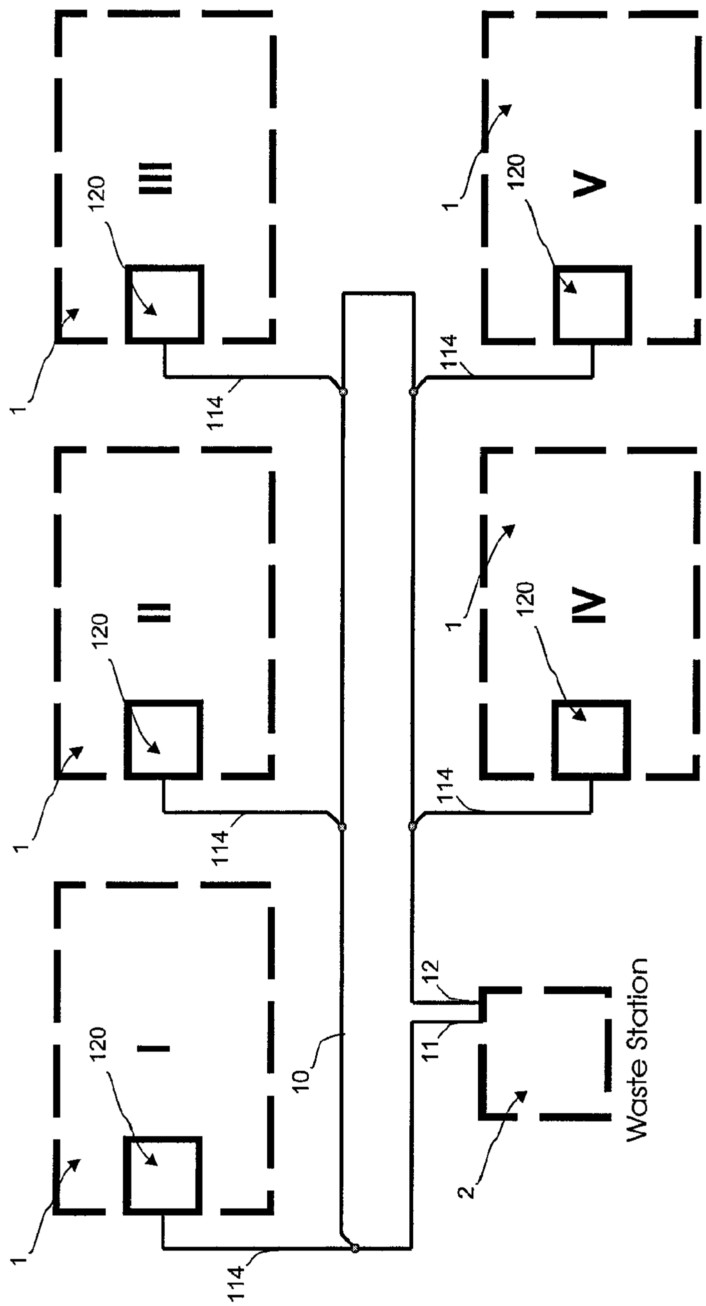
FIG. 7 presents a diagrammatic and simplified view of one total system according to the invention.

FIGS. 1-6 present the operation of a subsystem 1 of a material conveying system according to the invention, in different operating phases. FIG. 7 presents the total system, which comprises five subsystems 1 (I, II, III, IV, V) and also a waste station 2 and the necessary conveying piping 10, 11, 12, 114 between the subsystems and the waste station.

Figure 1:
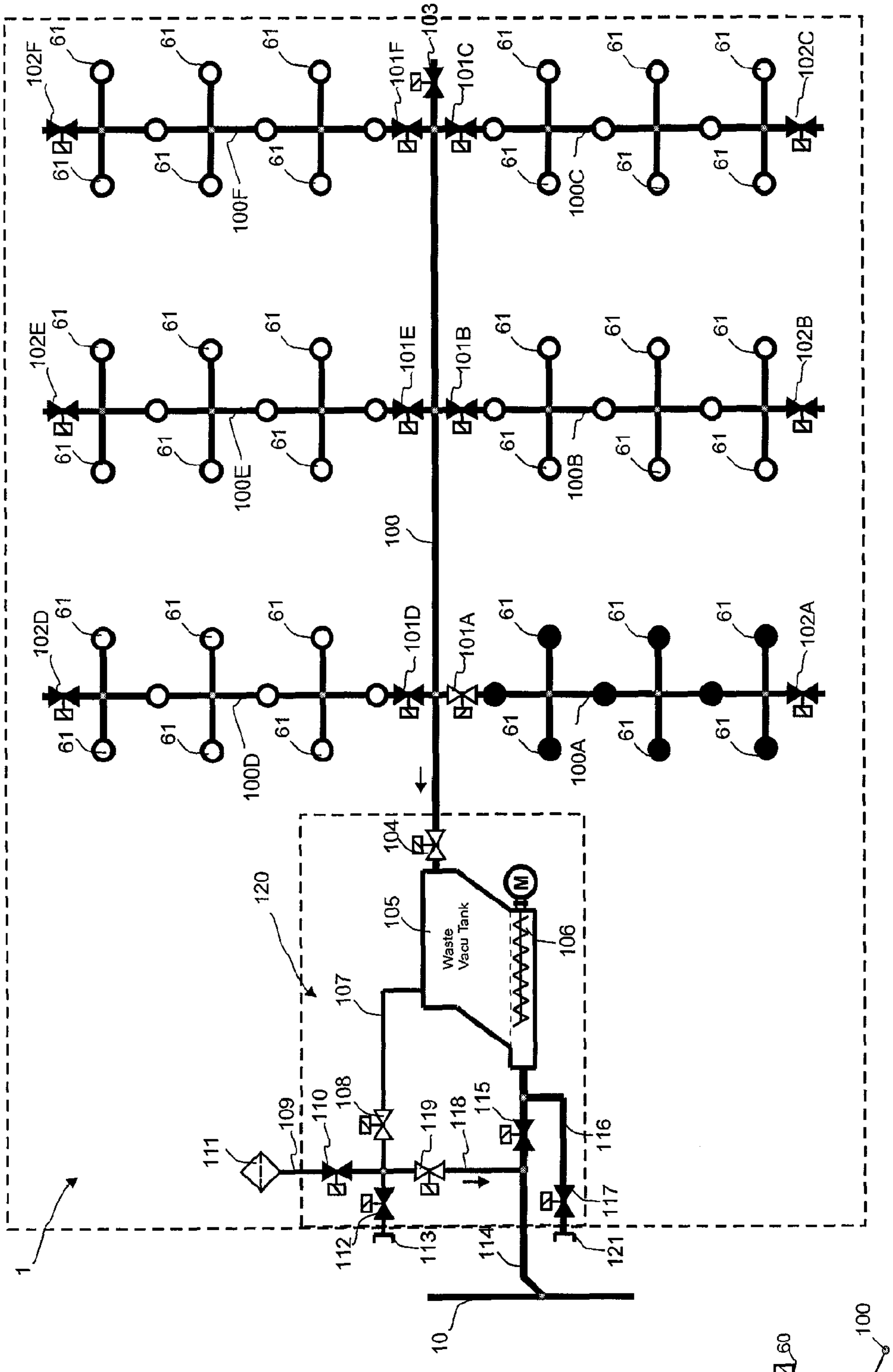
FIG. 1 presents one system according to an embodiment of the invention as a diagram.
Figure 1A:
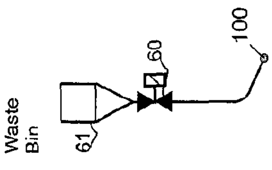
FIG. 1*a* presents a simplified view of a part of the system according to the invention.

FIG. 1 presents a subsystem 1, which comprises a material conveying pipe 100, along the side of which at least one, typically many, input points 61 are arranged. An input point 61 is a feed-in station of material, more particularly of waste material, intended to be conveyed, from which station the material, more particularly waste material, such as household waste, intended to be conveyed is fed into the conveying system. The feed-in station can also be a refuse chute, into which material is fed from input apertures on different floors of a building. The system can comprise a number of feed-in stations 61, from which the material intended to be conveyed is fed into conveying piping 100, 100A, 100B, 100C, 100D, 100E, 100F. A feed-in station 61 is marked in the figure with a dot, in which case by opening and closing a shut-off means, such as a valve means 60, in connection with the feed-in station, material can be conveyed from an input point into the conveying pipe. FIG. 1*a* presents one input point 61 to be used in a system according to the invention and the discharge valve 60 of said input point in more detail. The input point is connected on the valve side to a conveying pipe 100. Typically conveying piping comprises a main conveying pipe 100, to which it has been possible to connect a number of branch conveying pipes 100A, 100B, 100C, 100D, 100E, 100F and in turn to which branch conveying pipes it has been possible to connect a number of feed-in stations 61. The embodiment of FIG. 1 comprises six branch conveying pipes 100A, 100B, 100C, 100D, 100F, 100E, 100F connected to a main conveying pipe 100. The material fed in is conveyed along the conveying piping 100, 100A, 100B, 100C, 100D, 100E, 100F to the accumulator tank 105 of the subsystem 1. The accumulator tank 105 can be arranged in the waste space 120 of the subsystem 1, e.g. in a waste space specific to a city block.

In the embodiment of the figure a pipe 107 is connected to the accumulator tank 105, to the upper part of it, which pipe can be connected to a partial-vacuum source. According to one embodiment the partial-vacuum source is a partial-vacuum generator 25, 26 disposed at a waste station 2, the suction side of which partial-vacuum generator can be connected via piping 107, 118, 114, 10 to an accumulator tank 105 and via it to conveying piping 100, 100A, 100B, 100C, 100D, 100E, 100F. Correspondingly, the lower part of the accumulator tank 105 can be connected via piping 114 to the conveying piping 10. The pipe 114 comprises a valve means 115 between the accumulator tank 105 and the pipe 118.

A subsystem 1 can, in addition, comprise means for arranging an own separate partial vacuum source in connection with the subsystem. A medium pathway 107 to a first connection 113 is arranged from the accumulator tank 105, from the upper part of the accumulator tank in FIG. 1. A second medium pathway 116 to a second connection 121 is arranged from the lower part of the accumulator tank. The second medium pathway 116 comprises a valve means 117 between the accumulator tank 105 and the second connection 121. In the embodiment of the figure the second medium pathway 116 leaves from the pipe 114 between the accumulator tank 105 and the valve 115.

In a subsystem the action path of suction to the accumulator tank 105 can be changed either to the upper part of the accumulator tank via the pathway 107 or to the lower part of the accumulator tank via the pathway 114.

In the following the operation of the system is described by the aid of FIGS. 1-6. FIG. 1 shows a situation in which it is desired to empty one or more material input points of the branch conveying pipe 100A.

When the suction side of the partial-vacuum generator 25, 26 is connected directly or via a conveying air duct to the accumulator tank, to which the discharge end of a conveying pipe 100 is in turn connected, a partial vacuum is produced in the conveying pipe 100. In this case the suction acts in the conveying pipe 100 via the medium pathway 107 connecting to the accumulator tank. An area valve 101A is between the main conveying pipe 100 and the branch conveying pipe 100A, which valve is open in this operating phase. In this case the suction is able to act also in the branch conveying pipe 100A. In the case according to the figure, when the valve means 60 of the point is opened in an input point 61, the material batch intended to be conveyed transfers into the branch conveying pipe 100A and onwards into the main conveying pipe 100. Possible replacement air into the conveying pipe comes e.g. via the input point 61 when opening the valve 60 to the conveying pipe. When the valve 60 of an input point is closed, the line valve 102A can be opened for receiving replacement air into the conveying pipe or the line valve 102A can be kept open when emptying material, in which case the material of the feed-in container 61 to be emptied is dropped into the air current moving in the conveying pipe 100A.

Figure 2:
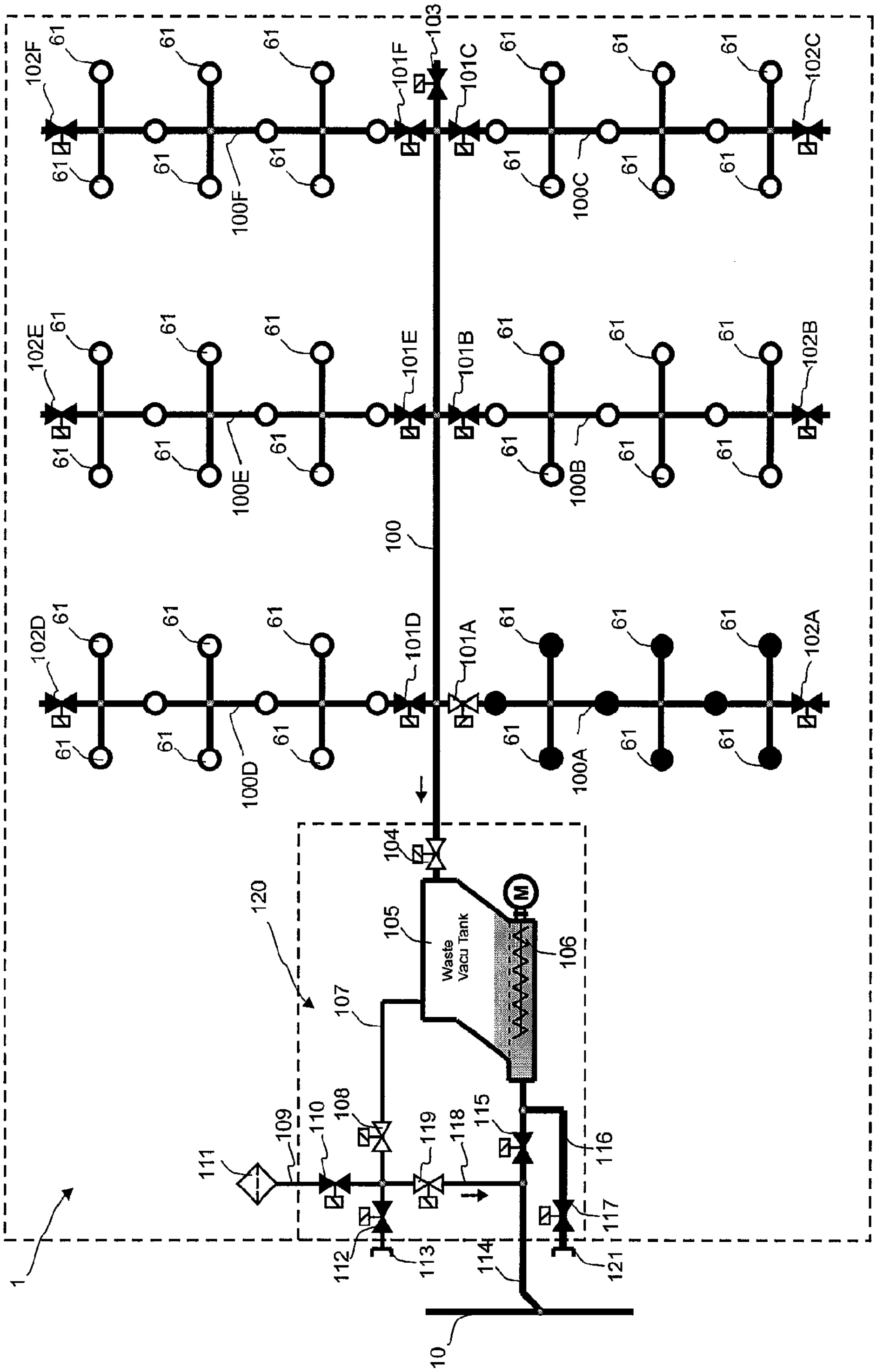
FIG. 2 presents one system according to an embodiment of the invention as a diagram, in a second operating phase.
Figure 3:
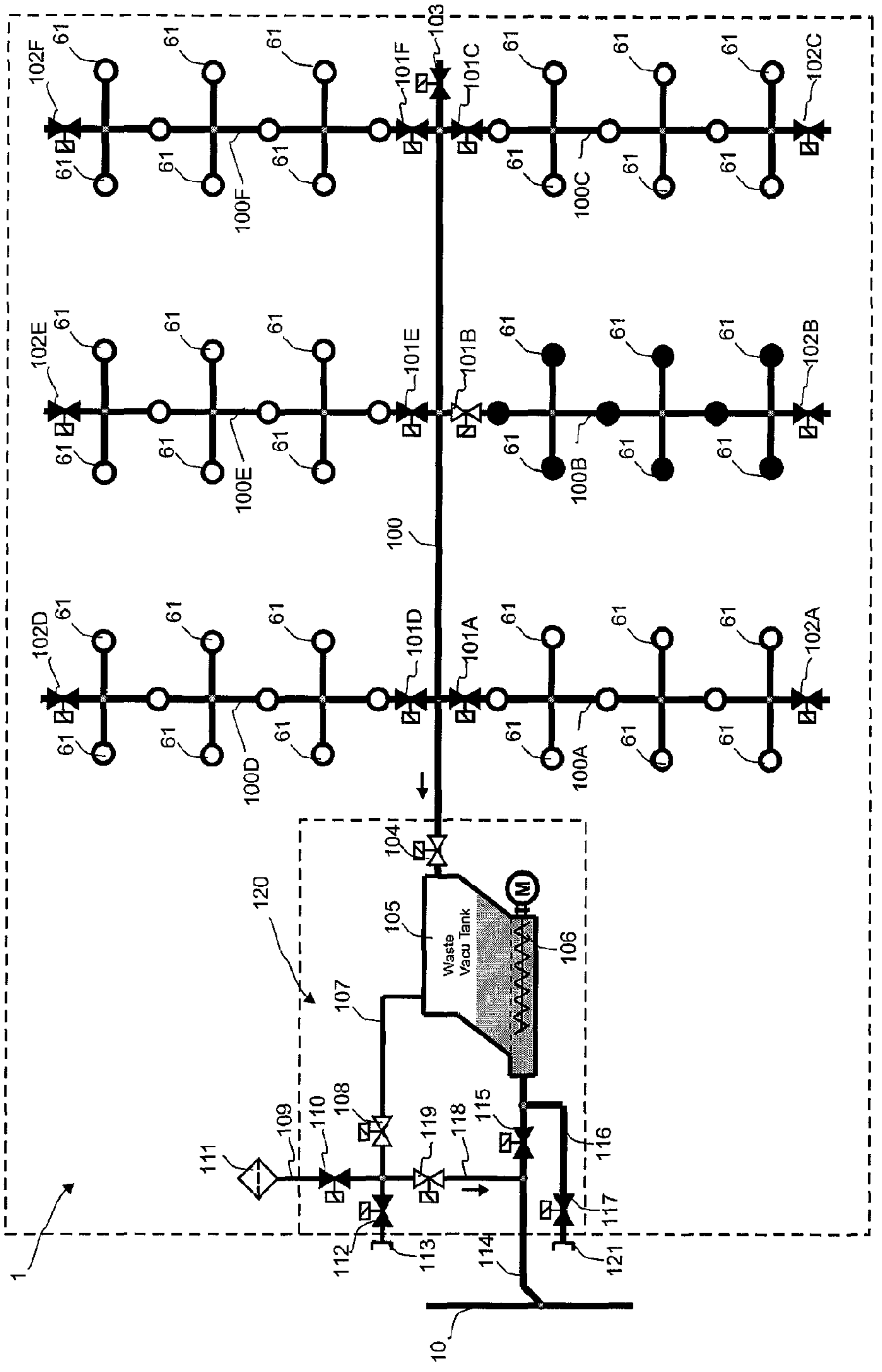
FIG. 3 presents one system according to an embodiment of the invention as a diagram, in a third operating phase.
Figure 4:
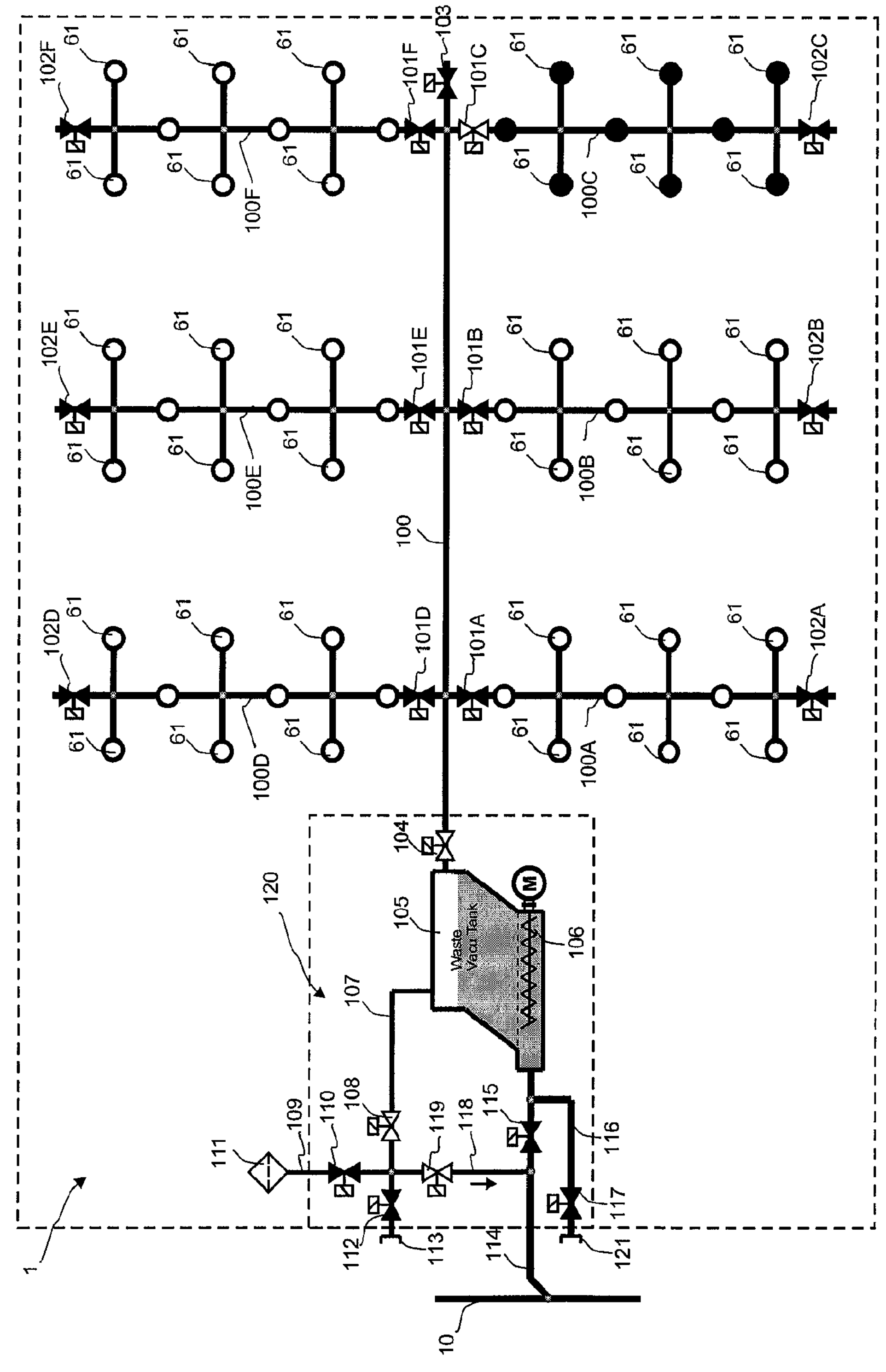
FIG. 4 presents one system according to an embodiment of the invention as a diagram, in a fourth operating phase.
Figure 5:
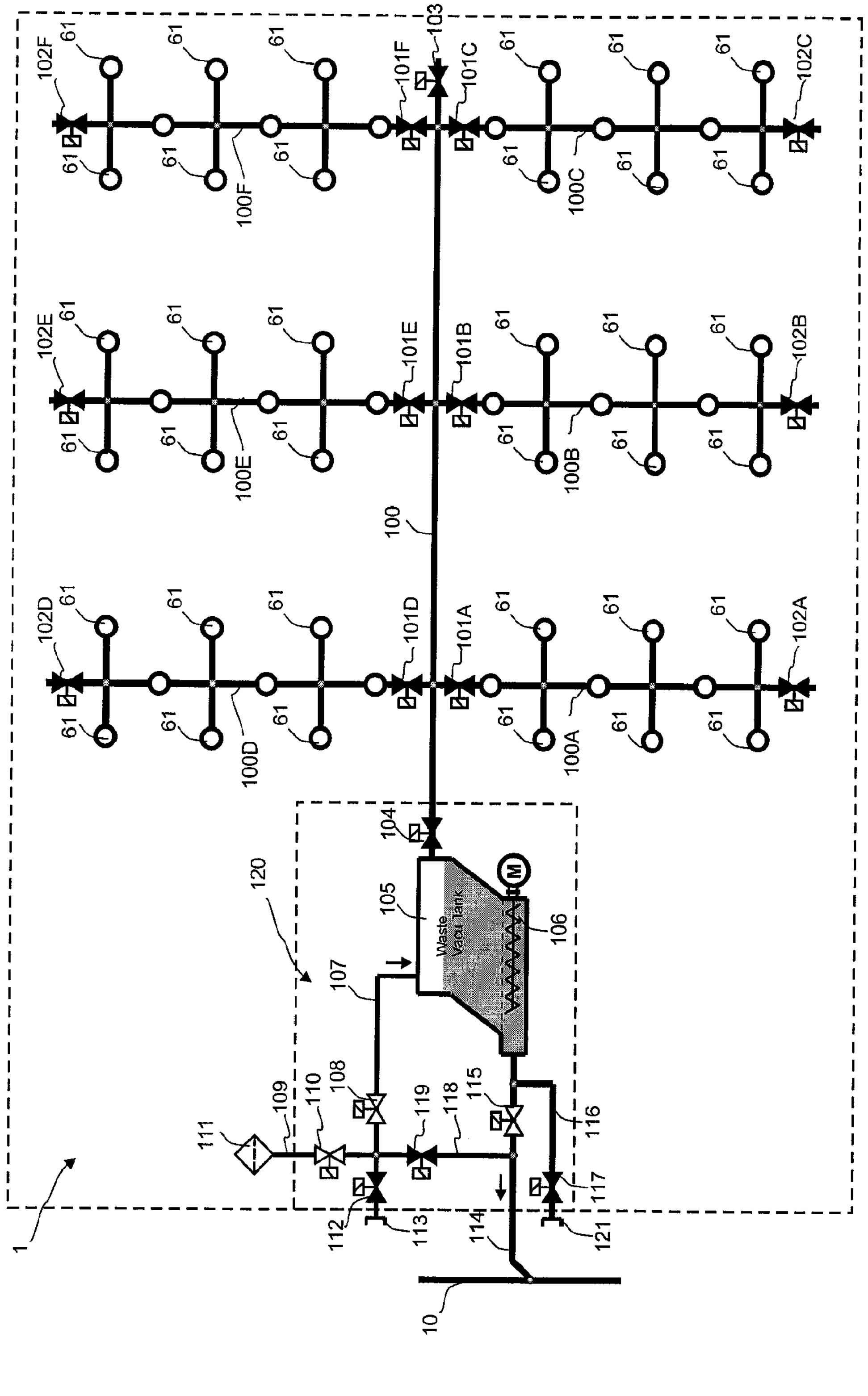
FIG. 5 presents one system according to the invention as a diagram, in a fifth operating phase.
Figure 6:
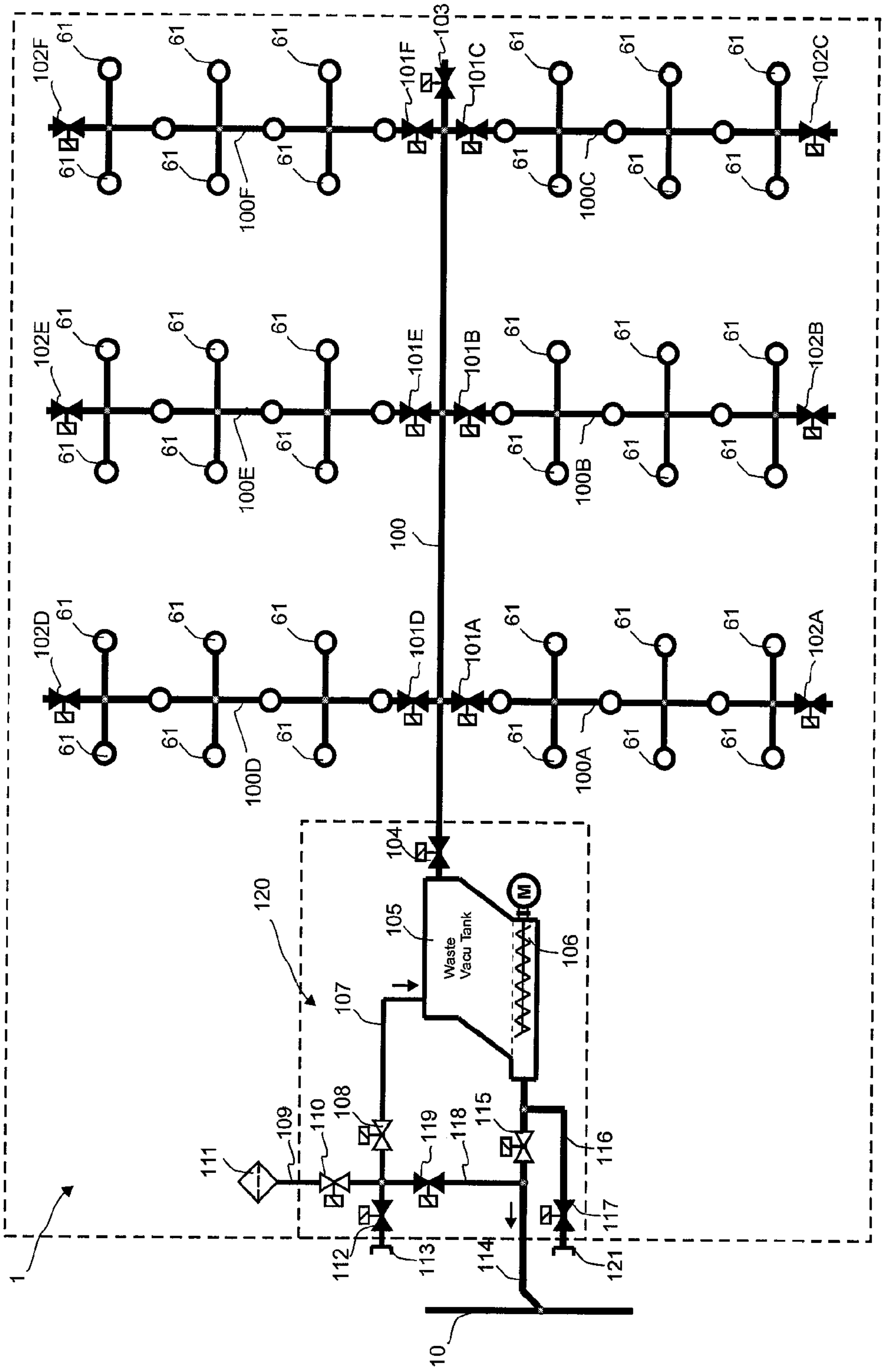
FIG. 6 presents one system according to the invention as a diagram, in a sixth operating phase.

The waste material is conveyed along the conveying piping 100A, 100 to the accumulator tank 105, where the conveying air separates from the waste material and the waste material remains in the accumulator tank 105 (FIG. 2).

When all the input points intended to be emptied have been emptied and the material is conveyed from the branch conveying pipe 100A into the conveying pipe 100, the area valve 101A can be closed and the area valve 101B (FIG. 3) of the branch conveying pipe 100B of the area intended to be emptied next can be opened. After the input points of this branch conveying pipe have been emptied into the conveying pipe 100B, 100 and conveyed in the piping onwards to the accumulator tank 105 in a corresponding manner to that described above in connection with FIGS. 1 and 2, the area valve of the branch conveying pipe 101B is closed and it is possible to move to the next area to be emptied by opening e.g. the area valve 101C (FIG. 4) of the branch conveying pipe 100C.

When the accumulator tank has filled up and it is desired to empty it onwards (FIG. 5), either into the conveying pipe 10 or into another reservoir, e.g. into a transport tanker, the connection from the conveying pipe 100 of the subsystem to the accumulator tank 105 is closed by closing the valve 104. Also the connection from the partial-vacuum generators 25, 26 to the medium pathway 107 to the upper part of the accumulator tank is closed with the valve means 119. The suction effect is transferred to the pathway 114 arranged in the lower part of the accumulator tank, in which case the material of the accumulator tank starts to move from the accumulator tank via the pathway 114 into the conveying pipe 10. Replacement air is received in the accumulator tank 105, in the upper part of it, via the replacement air pipe 109 and the medium pathway 107, when the valves 108 and 110 are in the open position.

The direction of conveyance of material and the direction of travel of air are marked in the figures with arrows.

Conveyance of the material from the accumulator tank 105 can be assisted with extractor devices 106, such as with a worm conveyor, which is driven with a drive device M.

Alternatively, material can be conveyed from the accumulator tank 105 via the pipe 116 and the connection 121. In this case suction is achieved via the connection 121 e.g. with a portable partial-vacuum generator (not shown). In the operating phase in question the valve 115 of the pathway 114 is closed, in which case material is guided out via the connection 121.

It can also be conceived that the removal of material from the accumulator tank can be made more efficient by circulating conveying air via the connection 113 and the pathway 107 into the upper part of the accumulator tank. In this case the blowing side of the partial-vacuum generator would be connected to the pathway 107. Blowing together with suction could in this case assist and enhance the conveyance of material from the accumulator tank into the conveying pipe.

Figure 8A:
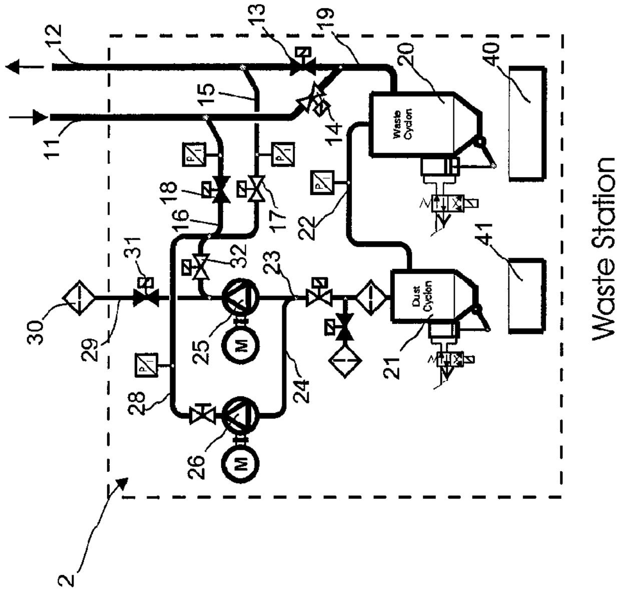
FIG. 8*a* presents a diagrammatic view of an embodiment of a waste station of the invention in a first operating phase.
Figure 8B:
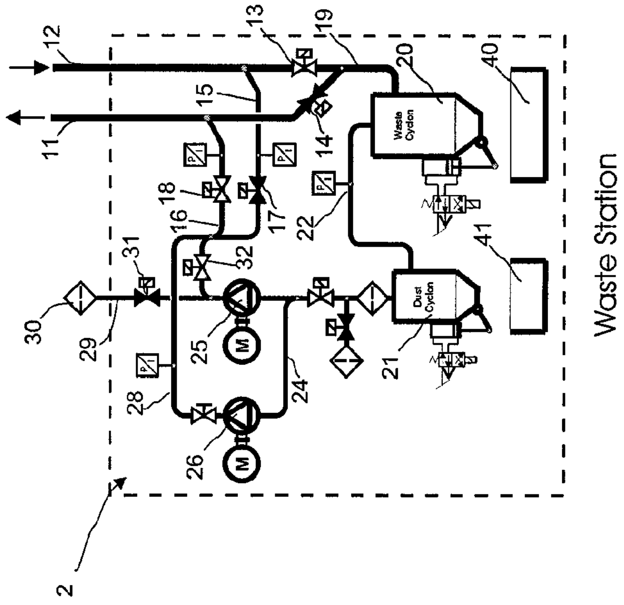
FIG. 8*b* presents a diagrammatic view of an embodiment of a waste station of the invention in a second operating phase.

A conveying air duct 22, 23, 24 leads from the separating device 20, 21 to the means 25, 26 for forming a partial vacuum in the conveying pipe. In the embodiment of FIGS. 8*a*, 8*b* the means for forming a partial vacuum comprise two vacuum pump units, both of which comprise a pump device 25; 26 and its drive device M. By the aid of the means for forming a partial vacuum the partial vacuum needed in conveying material is produced in the conveying piping 100, 100A, 100B, 100C, 100D, 100E, 100F and/or in a part of it.

According to FIG. 8*a* the waste material to be conveyed is conveyed from the subsystems 1 (I, II, III, IV, V,) of FIG. 7 along the piping 114, 10, 11 leading to the waste station 2 to the separating device 20, in which the material being conveyed separates, e.g. due to the dropping of speed and due to centrifugal force, from the conveying air. The separated material is removed, e.g. according to need, from the separating device 20 to a material container, such as to a waste container 40, or to further treatment. There can be many separating devices 20, 21, as in FIGS. 8*a*, 8*b* two, a first separating device 20 and a second separating device 21, e.g. a particle separator.

The first separating device 20 is connected with the duct 22 to the second separating device 21 and onwards with the conveying air duct 23, 24 to the means 25, 26 for forming a partial vacuum in the conveying pipe. In the embodiment of the figure the means for forming a partial vacuum comprise a pump device 25, 26, such as a vacuum pump unit. By the aid of the means for forming a partial vacuum the partial vacuum needed in conveying material is produced in the conveying piping 10, 100 and/or in a part of it. The vacuum pump unit comprises at least one vacuum pump 25, 26, which is/are driven with a drive device M. The system comprises means for circulating conveying air in a circuit, a part of which is formed by at least a part of the conveying piping 10.

The effect of the suction sides of the partial-vacuum generators of a waste station 2 can be varied in the conveying pipe 10 according to FIGS. 8*a* and 8*b*. In FIG. 8*a* the pipe 11 is an inlet pipe of the conveying pipe 10, the valve 14 of which pipe 11 is open to the pipe 19, which leads the pathway onwards to the separating device 20. The blowing sides of the partial-vacuum pump devices can be connected to blow into the conveying pipe, into the outlet pipe 12 of it. The first end 11 of the conveying pipe 10, i.e. the inlet pipe in FIG. 8*a*, is connected via a separating means to the suction side of the pump devices, and the second end 12, the outlet side in FIG. 8*a*, is connected to the blowing side of the pump device, in which case there is a medium connection from the blowing side of the pump devices to the second end 12 of the ring-shaped conveying pipe.

In the system presented by FIG. 7 the main conveying pipe 10 is ring-shaped, in which case the conveying air circulation in the main conveying pipe 10 can be varied, depending on whether suction is arranged via the first end 11 or via the second end 12 of the main conveying pipe.

It is possible to effectively produce overpressure on the blowing side of a pump and/or a partial vacuum and/or a suction effect on the suction side of a pump device.

The invention thus relates to a method in a pneumatic material conveying system, such as in a waste conveying system, which conveying system comprises at least one input point 61 of material, more particularly of waste material, a material conveying pipe 100, which can be connected to an input point 61, and a separating device, in which the material to be conveyed is separated from the conveying air, and also means for achieving a pressure difference in the conveying pipe 100 at least during the conveyance of material. In the method material is conveyed from an input point 61 to the accumulator tank 105 of a subsystem 1, where the material is separated from the conveying air and in a second phase the accumulator tank 105 of the subsystem is emptied.

According to one embodiment in the method in connection with a subsystem its own partial-vacuum generating apparatus is used to achieve the suction effect needed in material conveyance.

According to one embodiment in the method the partial-vacuum generating apparatus of a more extensive waste conveying system is used to achieve the suction effect needed in material conveyance.

According to one embodiment the material is conveyed from an accumulator tank of a subsystem 1 onwards along a conveying pipe 10 to the separating device 20 of a waste station 2, where the material to be conveyed is separated from the conveying air.

According to one embodiment the conveying pipe 10 of a more extensive system is connected into a circuit such that conveying air can be circulated in the conveying pipe 10.

According to one preferred embodiment in the method a partial vacuum is achieved in the circuit with at least one pump device 25, 26, such as with a partial-vacuum generator and/or a fan, the suction side of which is connected to a separating device 20.

According to one preferred embodiment in the method material is fed into the conveying pipe 100 from the input points 61 of material, which are the input points of waste, such as waste receptacles or refuse chutes.

According to one embodiment in the method the subsystems 1 are waste conveying systems of a certain area, such as of a city block.

According to one embodiment an extensive system, i.e. a total system, is a waste conveying system of a certain area, such as of a city district, which extensive system comprises a number of subsystems 1.

The invention also relates to an apparatus in a pneumatic material conveying system, such as in a waste conveying system, which comprises at least one input point 61 of material, more particularly of waste material, a material conveying pipe 100, which can be connected to an input point 61, and a separating device, in which the material to be conveyed is separated from the conveying air, and also means 25, 26 for achieving a pressure difference in the conveying pipe 100 at least during the conveyance of material. The apparatus comprises means for conveying material from an input point 61 to the accumulator tank 105 of a subsystem 1, where the material is separated from the conveying air and which subsystem is fitted to be connected to a local partial-vacuum generating apparatus and to a partial-vacuum generating apparatus of a more extensive waste conveying system.

According to one embodiment the apparatus comprises means for conveying material from an accumulator tank of a subsystem 1 onwards along a conveying pipe 10 to the separating device 20 of a waste station 2, where the material to be conveyed is separated from the conveying air.

According to one embodiment the conveying pipe 10 of a more extensive system is fitted to be connected into a circuit such that conveying air can be circulated in the conveying pipe 10.

According to one embodiment at least one pump device 25, 26, such as a partial-vacuum generator and/or a fan, the suction side of which is connected to a separating device 20, is fitted into the circuit of a more extensive system.

According to one embodiment the input points 61 of material are the input points of waste, such as waste receptacles or refuse chutes.

According to one embodiment a subsystem 1 is a waste conveying system of a certain area, such as of a city block.

According to one embodiment an extensive system, i.e. a total system, is a waste conveying system of a certain area, such as of a city district, which extensive system comprises a number of subsystems 1.

It is obvious to the person skilled in the art that the invention is not limited to the embodiments presented above, but that it can be varied within the scope of the claims presented below. The characteristic features possibly presented in the description in conjunction with other characteristic features can, if necessary, also be used separately to each other.

The invention claimed is:

1. A method for conveying waste material from input points to a waste station, in a pneumatic waste conveying system, which comprises, providing an extensive waste conveying system formed from a plurality of subsystems, operatively connected to a waste station;

providing, in a first phase, at least one input point for supplying waste material toe conveying pipes of said subsystems, conveying said waste material through the conveying pipes by a pressure difference produced in the conveying pipes to an accumulator tank which functions as a separation device of each of the subsystems where the waste material is separated from the conveying air; and providing a second phase wherein the accumulator tank of the subsystem is emptied by selectively conveying the waste material from the accumulation tank of each of the subsystems to the waste station;

wherein the airflow for conveying the waste material is generated by a partial vacuum generating system as a means for achieving a pressure difference and which is provided in the waste station and is adapted to communicate with the accumulator tanks of each of the subsystems and with the entirety of the conveying pipes of said subsystems for achieving the pressure difference in the waste conveying system.

2. The method according to claim 1, wherein at least one of the subsystems is provided with a partial-vacuum generating system for facilitating the generation of airflow.

3. The method according to claim 1, wherein the waste material is conveyed from the accumulator tank of the subsystem to a separating device in the waste station, where the waste material being conveyed is separated from conveying air.

4. The method according to claim 3, wherein the partial vacuum is achieved with at least one pump device, the suction side of which is connected to the separating device.

5. The method according to claim 1, wherein the subsystems include waste conveying systems of a city block.

6. The method according to claim 2, wherein the waste material introduced at the input point is obtained from waste receptacles or refuse chutes.

* * * * *